(12) United States Patent  
Kolz et al.

(10) Patent No.: US 8,132,227 B2
(45) Date of Patent: *Mar. 6, 2012

(54) DATA MANAGEMENT IN A COMPUTER SYSTEM

(75) Inventors: Daniel P. Kolz, Rochester, MN (US); Christopher J. Kundinger, Rochester, MN (US); Taylor L. Schreck, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 879 days.

This patent is subject to a terminal disclaimer.

(21) Appl. No.: 12/101,303

(22) Filed: Apr. 11, 2008

(65) Prior Publication Data

US 2009/0260053 A1    Oct. 15, 2009

(51) Int. Cl.
*G06F 21/00* (2006.01)
(52) U.S. Cl. .............................. 726/1; 715/752; 707/100
(58) Field of Classification Search ...... 726/1; 707/100; 715/752

See application file for complete search history.

(56) References Cited

U.S. PATENT DOCUMENTS

| | | | |
|---|---|---|---|
| 6,993,564 B2 * | 1/2006 | Whitten, II | 709/207 |
| 7,774,711 B2 * | 8/2010 | Valeski | 715/752 |
| 2003/0120655 A1 * | 6/2003 | Ohwada et al. | 707/9 |
| 2004/0039754 A1 * | 2/2004 | Harple, Jr. | 707/104.1 |
| 2008/0004864 A1 * | 1/2008 | Gabrilovich et al. | 704/9 |
| 2009/0132561 A1 * | 5/2009 | Cormode et al. | 707/100 |

* cited by examiner

*Primary Examiner* — Krista Zele
*Assistant Examiner* — Andrew Georgandellis
(74) *Attorney, Agent, or Firm* — Patterson & Sheridan LLP

(57) ABSTRACT

Embodiments of the invention generally provide methods, systems, and articles of manufacture that facilitate classification of a data access authority of unclassified users into one or more categories, and control access of data by the users based on the categories. When an unclassified user is found in an organization chart, one or more classified users near the unclassified user in the data tree may be identified. The unclassified user may be compared to the identified classified users to determine one or more suggested data access categories for classifying the unclassified user. The unclassified user may therefore be classified into one of the suggested data access category based on, for example, user input.

23 Claims, 4 Drawing Sheets

DATA MANAGEMENT IN A COMPUTER SYSTEM

BACKGROUND OF THE INVENTION

1. Field of the Invention

Embodiments of the invention are generally related to data security, and more specifically to limiting access to data based on a user's role.

2. Description of the Related Art

Modern business organizations maintain and analyze large amounts of data regarding their consumers, consumer behavior, markets in which products are sold, etc. Some of the data maintained by the organizations may be sensitive, for example, consumer social security numbers, bank account numbers, credit card information, and the like. Protection of such sensitive information may be crucial to assuring customers of the organization that their identities are safe. For example, most organizations that offer credit cards implement the Payment Card Industry Data Security Standard (PCI DSS) to prevent credit card fraud and other security vulnerabilities and threats while processing credit card transactions. Data security has also been emphasized by several recent regulations such as the Health Insurance Portability and Accountability Act (HIPAA) and the Sarbanes-Oxley Act. Generally, the data security standards and regulations require that data be provided only on a "need to know" basis. In other words, access to data is given only to those individuals that "need to know" the data.

SUMMARY OF THE INVENTION

The present invention generally relates to data security, and more specifically to limiting access to data based on a user's role by classifying a data access authority of users of a computer system. The classification of data access authority of users is referred to hereinafter, in short, as 'classifying users' for the sake of convenience.

One embodiment of the invention provides a computer implemented method for classifying a data access authority of users of a computer system. The method generally comprises identifying an unclassified user in an organizational object comprising classified users, each of the classified users being classified into at least one of a predefined set of categories, wherein the organizational object relates the unclassified user and the classified users to each other according to one or more attributes, and selecting one or more classified users from the organizational object, wherein the one or more classified users are selected according to a relationship with the unclassified user defined by the organizational object. The method further comprises comparing the one or more classified users to the unclassified user to determine similarities between the one or more classified users and the unclassified user, and generating one or more suggested categories from the predefined set of categories for classifying the unclassified user, wherein the one or more suggested categories are generated based on the comparison between the one or more classified users and the unclassified user.

Another embodiment of the invention provides a computer readable storage medium containing a program product which, when executed, performs an operation for classifying a data access authority of users of a computer system. The operation generally comprises identifying an unclassified user in an organizational object comprising classified users, each of the classified users being classified into at least one of a predefined set of categories, wherein the organizational object relates the unclassified user and the classified users to each other according to one or more attributes, and selecting one or more classified users from the organization object, wherein the one or more classified users are selected according to a relationship with the unclassified user defined by the organizational object. The operation further comprises comparing the one or more classified users to the unclassified user to determine similarities between the one or more classified users and the unclassified user, and generating one or more suggested categories from the predefined set of categories for classifying the unclassified user, wherein the one or more suggested categories are generated based on the comparison between the one or more classified users and the unclassified user.

Yet another embodiment of the invention provides a system, generally comprising a memory and at least one processor. The memory comprises a user classification program configured to classify a data access authority of unclassified users in an organizational object comprising classified users, wherein each of the classified users being classified into at least one of a predefined set of categories, wherein the organizational object relates the unclassified user and the classified users to each other according to one or more attributes. The at least one processor, while executing the data classification program, is generally configured to identify an unclassified user in an organization chart, and select one or more classified users from the organization chart, wherein the one or more classified users are selected according to a relationship with the unclassified user defined by the organizational object. The at least one processor is further configured to compare the one or more classified users to the unclassified user to determine similarities between the one or more classified users and the unclassified user, and generate one or more suggested categories from the predefined set of categories for classifying the unclassified user, wherein the one or more suggested categories are generated based on the comparison between the one or more classified users and the unclassified user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
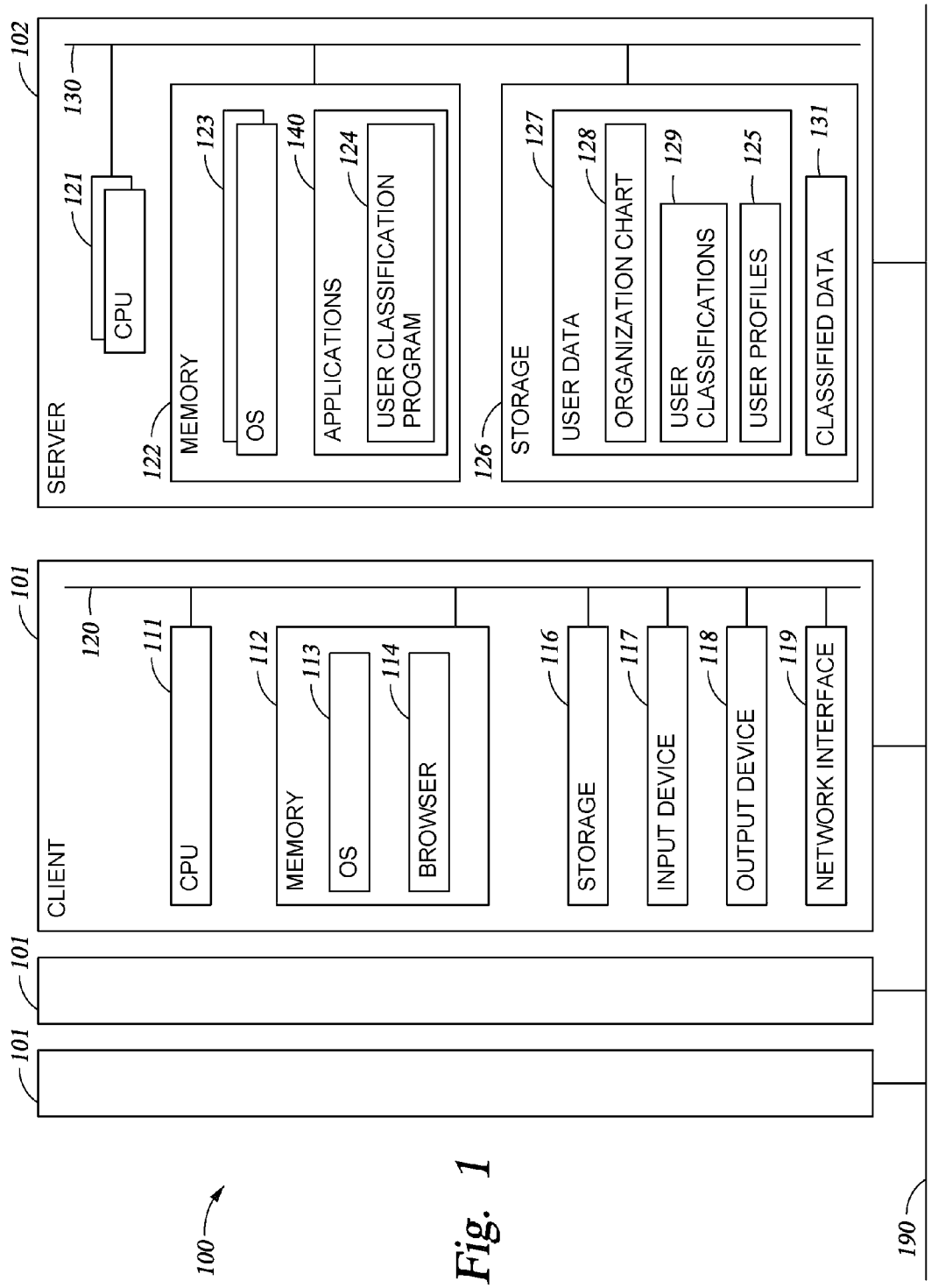
FIG. 1 illustrates an exemplary system according to an embodiment of the invention.

Embodiments of the invention generally provide methods, systems, and articles of manufacture that facilitate classification of a data access authority of unclassified users into one or more categories, and control access of data by the users based on the categories. When an unclassified user is found in an organization chart, one or more classified users near the unclassified user in the data tree may be identified. The unclassified user may be compared to the identified classified users to determine one or more suggested data access categories for classifying the unclassified user. The unclassified user may therefore be classified into one of the suggested data access category based on, for example, user input.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

FIG. 1 depicts a block diagram of a networked system 100 in which embodiments of the invention may be implemented. In general, the networked system 100 includes a client (e.g., user's) computer 101 (three such client computers 101 are shown) and at least one server 102 (one such server 102 shown). The client computers 101 and server 102 are connected via a network 190. In general, the network 190 may be a local area network (LAN), a metropolitan area network (MAN), a wide area network (WAN), or the like. In a particular embodiment, the network 190 is the Internet.

The client computer 101 includes a Central Processing Unit (CPU) 111 connected via a bus 120 to a memory 112, storage 116, an input device 117, an output device 118, and a network interface device 119. The input device 117 can be any device to give input to the client computer 101. For example, a keyboard, keypad, light-pen, touch-screen, trackball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 190. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 may include a browser program 114 which, when executed by CPU 111, provides support for browsing content available at a server 102 or another client computer 101. In one embodiment, browser program 114 may include a web-based Graphical User Interface (GUI), which allows the user to display Hyper Text Markup Language (HTML) information. In one embodiment, the GUI may be configured to allow a user to create a search string, request search results from a server 102 or client computer 101, and display search results. More generally, however, the browser program 114 may be a GUI-based program capable of rendering any information transferred from a client computer 101 and/or server 102.

The server 102 may by physically arranged in a manner similar to the client computer 101. Accordingly, the server 102 is shown generally comprising at least one CPU 121, memory 122, and a storage device 126, coupled with one another by a bus 130. Memory 122 may be a random access memory sufficiently large to hold the necessary programming and data structures that are located on server 102.

In one embodiment, server 102 may be a logically partitioned system, wherein each logical partition of the system is assigned one or more resources, for example, CPUs 121 and memory 122, available in server 102. Accordingly, in one embodiment, server 102 may generally be under the control of one or more operating systems 123 shown residing in memory 122. Each logical partition of server 102 may be under the control of one of the operating systems 123. Examples of the operating system 123 include IBM OS/400®, UNIX, Microsoft Windows®, and the like. More generally, any operating system capable of supporting the functions described herein may be used.

The memory 122 further includes one or more applications 140. The applications 140 may be software products comprising a plurality of instructions that are resident at various times in various memory and storage devices in the computer system 100. When read and executed by one or more processors 121 in the server 102, the applications 140 may cause the computer system 100 to perform the steps necessary to execute steps or elements embodying the various aspects of the invention. In one embodiment, the applications 140 may include a user classification program 124, which is discussed in greater detail below.

Storage 126 may include user data 127 and classified data 131. The classified data 131 may include any data that is created, modified, or otherwise accessed on by the applications 140. For example, in one embodiment, the system 100 may be maintained by a hospital in which the classified data 131 may represent patient records, research data, administrative records, and the like. The patient records may be classified into one or more categories, such as, for example, surgery data, pediatrics data, accounting data, and the like. In one embodiment, the access and modification of data in the storage device 126 may be performed by the applications 140 in response to user input. For example, a user may initiate the browser program 114 and access or modify data in the storage device 126 via an application 140. The application 140 may be configured to display the data in the browser program 114 to facilitate user access and modification.

User data 127 may generally be any data describing users of the system. For example, in one embodiment, user data 127 may include an organizational chart 128. The organizational chart 128 may include information such as, for example, names of individuals, job titles, supervisors of individuals, and the like. In one embodiment, the user data 127 may also include one or more user profiles 125. The user profiles 125 may be profiles associated with one or more individuals in the organizational chart 128. In one embodiment, the user profiles may provide user names and passwords to access one or more services provided by the system, for example, email, local area network (LAN) access, internet access, database access, and the like.

In one embodiment of the invention, user data 127 may include user data access classifications 129, referred to hereinafter simply as 'user classifications' 129. The user classifications 129 may define a role for each user of the system, for example, the users in the organizational chart 128. For example, users in a hospital system may be classified as 'doctors', 'nurses', 'lawyers', and the like. In one embodiment of the invention, user access to the classified data 131 may be limited based on a user's role within the organization. For example, in a hospital, only 'doctors' and 'nurses' may have access to patient records, but the 'lawyers' may not have such access. By limiting user access to data based on a user's role within the organization, greater data security based on a 'need to know' standard may be achieved. In some cases, such limitations on user access to data may be necessary to comply with a data security standard such as the PCI DSS standard, or a regulation such as the Sarbanes Oxley Act.

Traditionally, classification of users into one or more roles has been a manual process in which one or more individuals find, analyze, and classify each person having access to the data 131 into one or more roles. However, this process may be tedious, inefficient, time consuming, and prone to human error. For example, a person classifying users into one or more roles may have to identify each system user and investigate the user's role in the organization prior to classifying the user. Furthermore, each of the user's profiles may have to also be identified to ensure that the user has appropriate access to the data 131. If a user does not have a user profile to access a particular service, a profile may have to be created for the user. For example, a person classifying users may identify an employee of a hospital as a 'doctor'. After classifying the employee as a doctor, one or more profiles may have to be created for the doctor, such as, for example, a profile for accessing an email account, a profile for accessing a database containing patient records, and the like.

While the user classification program 124, organizational chart 128, user profiles 125, and classified data 131 are shown as being stored within the storage device 126 of server 102, in alternative embodiments, the user classification program 124, organizational chart 128, user profiles 125, and classified data 131 may be stored in any device in the system 100, for example, in memory 122 of server 102 or memory 112 or storage 116 of a client computer 101, and the like. Furthermore, while embodiments are described herein with respect to a client/server model, this model is merely used for purposes of illustration. Persons skilled in the art will recognize other communication paradigms, all of which are contemplated as embodiments of the present invention. As such, the terms "client" and "server" are not to be taken as limiting.

Identifying Related Users Having a Data Access Classification

Embodiments of the invention provide a computer implemented method for classifying data access authority of unclassified users, thereby obviating the tedious and time consuming manual classification process. In one embodiment, the user classification program 124 may be configured to detect unclassified users in the organizational chart 128 and identify one or more categories into which the user may be classified. The user classification program 124 may be configured to determine the one or more categories based on one or more classified users in the user classifications 129, as will be discussed in greater in the next section.

Figure 2:
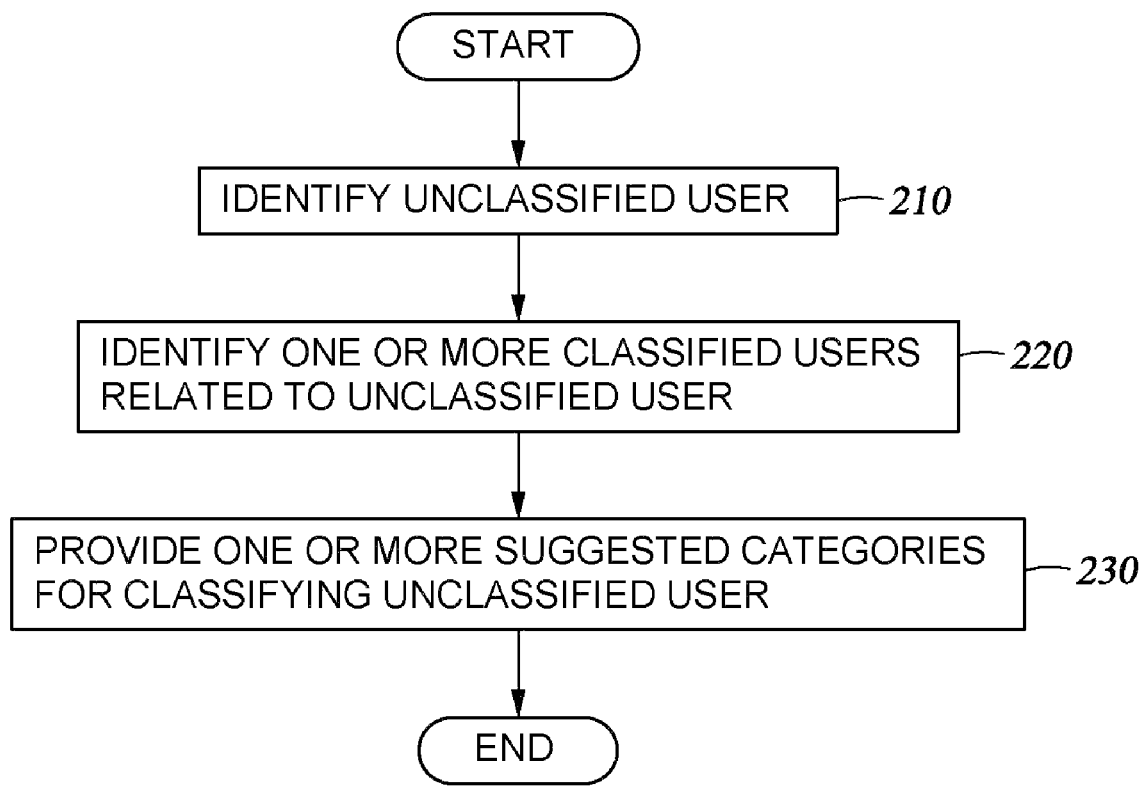
FIG. 2 is a flow diagram of exemplary operations performed while classifying a data access authority of users, according to an embodiment of the invention.

FIG. 2 is a flow diagram of exemplary operations that may be performed by the user classification program 124 to classify unclassified users. The operations may begin in step 210 by identifying an unclassified user. In one embodiment of the invention, the user classification program may be initiated by user input. For example, a system administrator may initiate the user classification program 124 to facilitate classification of a data access authority for unclassified users. In alternative embodiments, the user classification program 124 may be configured to monitor modification and creation of users in the system and identify unclassified users as they are created. In other embodiments, the user classification program may be configured to automatically initiate a search for unclassified users after a predetermined time period, for example, after every hour.

In one embodiment of the invention, identifying unclassified users may involve examining the organizational chart 128 and the user classifications 129 to determine whether each user in the organizational chart 128 has an associated classification 129. For example, the data classification program 124 may step through each individual in the organization chart 128 and determine whether a user data access classification 129 exists for the individual. If no user classification 129 exists, the individual may be an unclassified user.

In step 220, the user classification program may identify one or more classified users related to the unclassified user. The data classification program 124 may select the one or more classified users based on any reasonable relationship between the unclassified user and the classified users. For example, in one embodiment, the classified users may be selected based on a position of classified users relative to the unclassified user in the organization chart 128. For example, in one embodiment, if the organizational chart 128 indicates that the unclassified user reports to the same person as one or more classified users, the one or more classified users may be identified as being related to the unclassified user. In alternative embodiments, one or more classified users in one or more levels above or below the unclassified user in the organizational chart 128 may be selected as related classified users.

In some embodiments, the user classification program 124 may be configured to select classified users within a threshold distance from the unclassified user. For example, in one embodiment, the user classification program 124 may search for classified users within a predetermined number of levels above or below the unclassified user in the organizational chart 128.

In step 230, the user classification program may provide one or more suggested categories for classifying the unclassified user based on the identified one or more related classified users. For example, in one embodiment, if the one or more classified users are classified as doctors, the user classification program may suggest classifying the unclassified user also as a 'doctor'. The classification of unclassified users based on the identified one or more classified users is described in greater detail in the next section. The remainder of this section provides exemplary methods for identifying related classified users.

Figure 3:
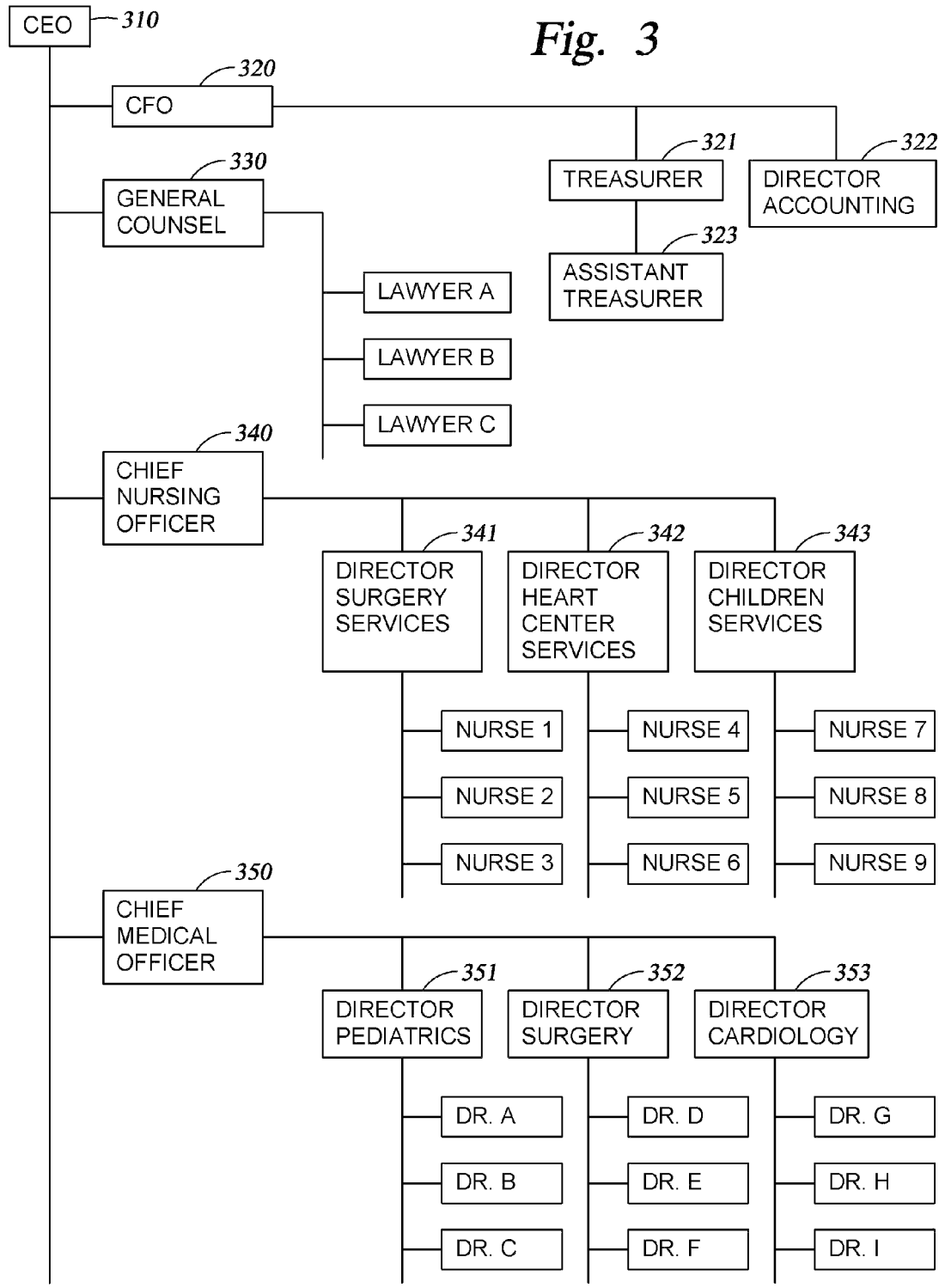
FIG. 3 illustrates an exemplary organization chart according to an embodiment of the invention.

FIG. 3 illustrates an exemplary organization chart 300 according to an embodiment of the invention. For purposes of illustration, organization chart 300 is depicted as an exemplary hospital organization chart. As shown in FIG. 3, the hospital organization may include a Chief Executive Officer (CEO) at the top of the organization. The heads of one or more departments of the hospital may report to the CEO. Exemplary department heads may include the Chief Financial Officer (CFO) 320, the hospital's general counsel 330, chief nursing officer 340, chief medical officer 350, and the like, as depicted in FIG. 3.

Each department head may have one or more persons working under him. For example, Lawyers A-C may work for the general counsel 330, as illustrated in FIG. 3. In some cases, a department head may be in charge of one or more sub-departments. For example, the medical department of the hospital may be divided into the pediatrics department, surgery department, and cardiology department. Each sub-department may have a director in charge of the sub-department. For example, the pediatrics department may be lead by the director of pediatrics, the cardiology department may be lead by the director of cardiology, and the surgery department may be lead by the director of surgery.

The sub-department heads may report to the department head. For example, the directors of pediatrics, surgery, and cardiology may report to the chief medical officer, as illustrated in FIG. 3. Further, as illustrated in FIG. 3, each sub-department of the medical department may have one or more doctors. For example, doctors A-C may be pediatricians, doctors D-F may be surgeons, and doctors G-I may be cardiologists, as illustrated in FIG. 3.

The department of nursing may have a similar structure as the medical department. For example, as illustrated in FIG. 3, the directors of the surgery 341, heart center 342, and children's services 343 may report to the chief nursing officer 340. Further, nurses 1-3 may work under the director of surgery services, nurses 4-6 may work for the director of heart center services, and nurses 7-9 may work for the director of children's services, as shown in FIG. 3.

FIG. 3 also illustrates a treasurer 321 and a director of accounting 322 that work under the CFO 320. Further, an assistant treasurer 323 may work under the treasurer, as shown in FIG. 3. While an organizational chart for an exemplary hospital is illustrated in FIG. 3, embodiments of the invention are not limited to the organization chart depicted therein. More generally any organizational chart of any kind of organization comprising any number of departments and sub-departments, and any number of organizational levels fall within the purview of the invention.

In one embodiment of the invention, the individuals illustrated in the organization chart 300 may classified into one or more predefined categories, for example, 'doctors', 'pediatricians', 'cardiologists', 'surgeons', 'nurses', 'lawyers', 'managers', 'accountants', and the like. For example, the general counsel 330 and lawyers A-C may be classified as 'lawyers'. In some embodiments, an individual may be classified into two or more categories. For example, the general counsel may be classified as a 'lawyer' and a 'manager'.

Classifying data and data access authority of users into predefined categories may facilitate writing of natural language security policies using products such as, for example, IBM's Secure Perspective for System i (System i is a trademark of International Business Machines of Armonk, N.Y., in the US, other countries, or both) that map terms in the policy to resources on a system. For example, referring back to FIG. 1, the system 100 includes user classifications 129 and classified data 131. Security policy may therefore be written using the user classifications 129 and the classified data 131. An exemplary security policy for a hospital system may include, for example, "Only doctors can view patient records", wherein 'doctors' is a user classification and 'patient records' is a data classification. Such natural language policies may be automatically applied and verified during operation of the system 100, thereby providing data security.

In order for such policies to work, it may be necessary to ensure that data access authority of all users in the system are properly classified. Embodiments of the invention provide a computer implemented method for classifying unclassified users to obviate the tedious and time consuming manual classification process. To classify an unclassified user, user classification program 124 may first identify one or more classified users related to the unclassified user. In one embodiment, users in a same level as the unclassified user in the organization chart may be identified as related users.

For example, referring to FIG. 3, the doctors A-I may be considered to be in the same level of the organizational chart because each of the doctors A-I work for a sub-department of the medical department. Therefore, if doctor A is an unclassified user, the doctors B-I may be identified as users related to doctor A in one embodiment of the invention.

In one embodiment, while selecting one or more users at the same level, data classification program may be configured to limit the search for classified users to users that work for a particular department, sub-department, or particular individual in the organization. For example, in one embodiment, if the director of surgery services 341 is an unclassified user, the data classification program 124 may select the director of heart center services, and the director of children's services 343 as related users. However, data classification program 124 may not select Lawyers A-C as related classified users because they do not work under the same department (nursing) or the same person (chief nursing officer 340) as the director of surgery services 341.

In one embodiment of the invention, one or more users working under or above the unclassified user may be selected as related classified users. For example, if the general counsel 330 is an unclassified user, then the lawyers A-C may be selected as related classified users. Classified users above and/or below the unclassified users may be selected as related users because it may be likely that the classified users working under or above the unclassified users have the same privileges and access to data as the unclassified user. For example, the general counsel 330 and lawyers A-C are likely to be attorneys. Therefore, the general counsel 330 and lawyers A-C will likely fall under the same category, for example, 'lawyers'.

In some embodiments, the data classification program 124 may be configured to look for classified users in a predetermined number of levels above or below the level containing the unclassified user. For example, in one embodiment, the data classification program may search for classified users only two levels above the unclassified user. Accordingly, if the assistant treasurer 323 is an unclassified user, the data classification program may identify the treasurer 321 and CFO 320 as classified users related to the assistant treasurer 323. However, the data classification program 124 may not select the CEO 310 as a related classified user because the CEO is more than two levels above the assistant treasurer 323.

Analysis of Related Users and Respective Data Access Classifications

The user classification program 124 may identify several classified users using any one or a combination of the methods outlined in the previous section. After the related classified users are identified, the related classified users and the unclassified user may be analyzed to identify one or more categories into which the unclassified user may be classified.

Figure 4:
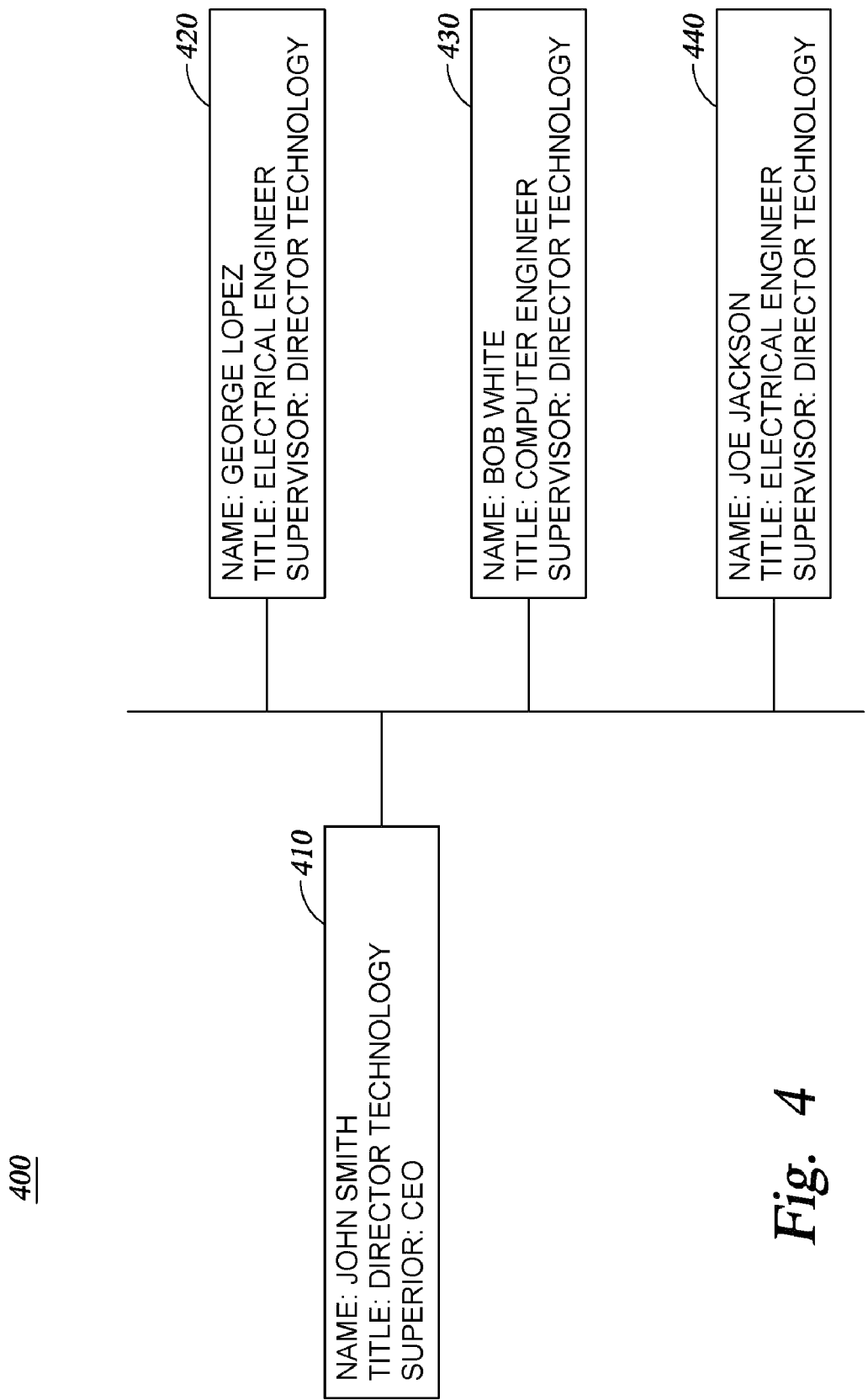
FIG. 4 illustrates exemplary organization chart according to an embodiment of the invention.

In one embodiment of the invention the user classification program 124 may be configured to suggest categories for classifying a data access authority of the unclassified user based on user data for the unclassified user and related classified users retrieved from the organization chart. The organization chart may include user data for example, user name, title, supervisor name, and the like. FIG. 4 illustrates exemplary user data in a portion of an organization chart 400. As illustrated in FIG. 4, the organization chart 400 may include a director of technology 410 and three engineers 420-440 working under the director of technology. As illustrated in FIG. 4, the organization chart 400 may include the names, designation, and a superior for each individual listed in the organization chart. For example, the name of the director of technology is John Smith, and his supervisor is the CEO.

In one embodiment, if the engineer 420 is an unclassified user, the data classification program 124 may select the engineers 430 and 440, as related classified users. The data classification program 124 may compare the user data contained in the organization chart 400 for the engineers 420-440 to determine suggested categories for classifying the unclassified user 420. For example, in one embodiment, data classification program 124 may be configured to compare the titles of the engineers 420-440 to determine the suggested categories. As illustrated in FIG. 4, engineers 420 and 440 are both electrical engineers and engineer 430 is a computer engineer. Accordingly, in one embodiment, the suggested classification for engineer 420 may include the classification of engineer 440 because both engineer 420 and 440 share the same title.

In an alternative embodiment, the superiors of the engineers 420-440 may also be compared. Therefore, because the engineers 420-440 report to the director of technology, in one embodiment, the suggested classifications for unclassified user 420 may include the classifications of both engineer 430 and engineer 440.

In one embodiment of the invention, the potential data access classifications for a given unclassified user may be displayed in a browser program 114 illustrated in FIG. 1, to facilitate selection of one or more of the suggested classifications. In some embodiments, for each of the suggested classifications, the user classification program may be configured to determine a probability that the unclassified user belongs to a given classification. The probability may be computed based on the analysis of the unclassified user and the related classified users as discussed above. The probability may be displayed in the browser program 114 to facilitate selection of an appropriate classification for the unclassified user.

In some embodiments, if it is determined that the suggested data access classifications are inaccurate the browser program 114 may allow a classification to be entered for the unclassified user. For example, a user such as, for example, a system administrator may view the suggested categories and associated probabilities in the browser program and determine that the categories and probabilities are unsatisfactory. Accordingly, the user may enter an appropriate classification in the browser program 114 to classify the user.

Alternatively, reanalysis of the unclassified user and related classified users may be requested for a new set of classification suggestions. While requesting the reanalysis, one or more parameters for identifying related classified users and/or for analysis may be entered. For example, the number of levels searched may be expanded (or contracted) to identify a different set of related classified users.

In some embodiments of the invention, user input may not be required for classification of unclassified users. For example, the user classification program may be configured to classify the unclassified user based on, for example, the probabilities calculated during the analysis.

In one embodiment, once the unclassified user has been classified, the user data access classification may be used to classify other unclassified users. For example, the previously unclassified user may be identified as related classified user of another unclassified user and analyzed to retrieve suggested classifications.

In one embodiment of the invention, in addition to classifying an unclassified user, the user classification program 124 may create and/or modify user profiles associated with the unclassified user. For example, referring back to FIG. 3, Dr. A may be an unclassified user. Upon determining that Dr. A should be classified in the 'doctors' category, the user classification program 124 may create or modify one or more profiles for Dr. A. For example, if Dr. A does not have a profile for accessing the patient records database, the user classification program 124 may create a suggested profile for facilitating access to the patient records database by Dr. A.

In one embodiment, creating a suggested profile may include suggesting a username and password for the unclassified user. The username may be created by using any combination of the previously unclassified user's first and last name, in one embodiment of the invention. A suggested password may also be similarly created.

In one embodiment of the invention, if an unclassified user is found to have illegal access to data, the user classification program 124 may suggest modification and/or deletion of one or more profiles for the user. For example, in FIG. 3, if the assistant treasurer 323 is found to have a profile for accessing the patient records against the security policy, the user classification program 124 may be configured to delete the profile granting such access to the assistant treasurer 323.

In one embodiment of the invention, the user classification program 124 may be configured to periodically step through each employee, whether classified or unclassified, and analyze each employee for compliance with a given security policy. For example, the user classification program may verify the user classification by comparing each user in the organization chart with one or more related users. Furthermore, the user classification program may verify that the user profiles of each user do not grant the user to unauthorized systems.

CONCLUSION

By providing an automated method for identifying and classifying a data access authority of unclassified users based on related classified users, embodiments of the invention make user classification more efficient and promote data security.

While the foregoing is directed to embodiments of the present invention, other and further embodiments of the invention may be devised without departing from the basic scope thereof, and the scope thereof is determined by the claims that follow.

What is claimed is:

1. A computer-implemented method for classifying a data access authority of users of a computer system, comprising:
    identifying an unclassified user in a hierarchical tree structure containing a plurality of users, wherein the plurality of users contains classified users and at least one unclassified user, wherein each of the classified users is classified into at least one of a predefined set of categories, and wherein the hierarchical tree structure relates users in the plurality of users to each other according to an organizational structure of an organizational entity;
    selecting one or more classified users from a subtree within the hierarchical tree structure, the subtree including less than all of the hierarchical tree structure and containing at least the unclassified user and the selected one or more classified users, wherein the one or more classified users are selected according to a relationship with the unclassified user defined by the hierarchical tree structure;
    comparing the selected one or more classified users to the unclassified user to determine similarities between the one or more classified users and the unclassified user; and
    generating, by operation of one or more computer processors, one or more suggested categories from the predefined set of categories for classifying the unclassified user, wherein the one or more suggested categories are generated based on the comparison between the one or more classified users and the unclassified user.

2. The method of claim 1, wherein selecting the one or more classified users comprises selecting the one or more classified users from a level comprising the unclassified user in the hierarchical tree structure.

3. The method of claim 1, wherein selecting the one or more classified users comprises selecting the one or more classified users from one or more levels above a level comprising the unclassified user in the hierarchical tree structure.

4. The method of claim 1, wherein selecting the one or more classified users comprises selecting the one or more classified users from one or more levels below a level comprising the unclassified user in the hierarchical tree structure.

5. The computer-implemented method of claim 1, wherein determining similarities between the one or more classified users and the unclassified user comprises determining whether the one or more classified users and the unclassified user have a similar title.

6. The computer-implemented method of claim 1, wherein determining similarities between the one or more classified users and the unclassified user comprises determining whether the one or more classified users and the unclassified user work under a common person.

7. The computer-implemented method of claim 1, further comprising receiving user input selecting at least one of the one or more suggested categories for the unclassified user, and classifying the unclassified user based on the user input.

8. The computer-implemented method of claim 7, further comprising generating one or more user profiles for the unclassified user based on the selected category, wherein each user profile provides access to a service provided by the computer system.

9. A computer readable storage medium containing a program product which, when executed, performs an operation for classifying a data access authority of users of a computer system, comprising:
    identifying an unclassified user in a hierarchical tree structure containing a plurality of users, wherein the plurality of users contains classified users and at least one unclassified user, wherein each of the classified users is classified into at least one of a predefined set of categories, and wherein the hierarchical tree structure relates users in the plurality of users to each other according to an organizational structure of an organizational entity;
    selecting one or more classified users from a subtree within the hierarchical tree structure, the subtree including less than all of the hierarchical tree structure and containing at least the unclassified user and the selected one or more classified users, wherein the one or more classified users are selected according to a relationship with the unclassified user defined by the hierarchical tree structure;
    comparing the one or more selected classified users to the unclassified user to determine similarities between the one or more classified users and the unclassified user; and
    generating one or more suggested categories from the predefined set of categories for classifying the unclassified user, wherein the one or more suggested categories are generated based on the comparison between the one or more classified users and the unclassified user.

10. The computer readable storage medium of claim 9, wherein selecting the one or more classified users comprises selecting the one or more classified users from a level comprising the unclassified user in the organizational object.

11. The computer readable storage medium of claim 9, wherein selecting the one or more classified users comprises selecting the one or more classified users from one or more levels above a level comprising the unclassified user.

12. The computer readable storage medium of claim 9, wherein selecting the one or more classified users comprises selecting the one or more classified users from one or more levels below a level comprising the unclassified user.

13. The computer readable storage medium of claim 9, wherein determining similarities between the one or more classified users and the unclassified user comprises determining whether the one or more classified users and the unclassified user have a similar title.

14. The computer readable storage medium of claim 9, wherein determining similarities between the one or more classified users and the unclassified user comprises determining whether the one or more classified users and the unclassified user work under a common person.

15. The computer readable storage medium of claim 9, wherein the operation further comprises receiving user input selecting at least one of the one or more suggested categories for the unclassified user, and classifying the unclassified user based on the user input.

16. The computer readable storage medium of claim 15, wherein the operation further comprises generating one or more user profiles for the unclassified user based on the selected category, wherein each user profile provides access to a service provided by the computer system.

17. A system, comprising:
memory comprising a user classification program configured to classify a data access authority of unclassified users in a hierarchical tree structure containing a plurality of users, wherein the plurality of users contains classified users and at least one unclassified user, wherein each of the classified users is classified into at least one of a predefined set of categories, and wherein the hierarchical tree structure relates users in the plurality of users to each other according to an organizational structure of an organizational entity; and
at least one processor, wherein each processor, while executing the data classification program, is configured to:
identify a first unclassified user in an organization chart;
select one or more classified users from a subtree within the hierarchical tree structure, the subtree including less than all of the hierarchical tree structure and containing at least the unclassified user and the selected one or more classified users, wherein the one or more classified users are selected according to a relationship with the unclassified user defined by the hierarchical tree structure;
compare the one or more selected classified users to the first unclassified user to determine similarities between the one or more classified users and the first unclassified user; and
generate one or more suggested categories from the predefined set of categories for classifying the first unclassified user, wherein the one or more suggested categories are generated based on the comparison between the one or more classified users and the first unclassified user.

18. The system of claim 17, wherein the processor is further configured to select the one or more classified users from a level comprising the unclassified user in the organizational object.

19. The system of claim 17, wherein the processor is further configured to select the one or more classified users from one or more levels below a level comprising the unclassified user in the organizational object.

20. The system of claim 17, wherein the processor is configured to determine similarities between the one or more classified users and the unclassified user by determining whether the one or more classified users and the unclassified user have a similar title.

21. The system of claim 17, wherein the processor is configured to determine similarities between the one or more classified users and the unclassified user by determining whether the one or more classified users and the unclassified user work under a common person.

22. The system of claim 17, wherein the processor is further configured to receive user input selecting at least one of the one or more suggested categories for the unclassified user, and classify the unclassified user based on the user input.

23. The system of claim 22, wherein the processor is further configured to generate one or more user profiles for the unclassified user based on the selected category, wherein each user profile provides access to a service provided by the computer system.

* * * * *